United States Patent
Fujishiro

(10) Patent No.: US 12,069,614 B2
(45) Date of Patent: Aug. 20, 2024

(54) SIDELINK CONFIGURATION METHOD AND APPARATUS

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 405 days.

(21) Appl. No.: 17/372,018

(22) Filed: Jul. 9, 2021

(65) Prior Publication Data

US 2021/0337516 A1 Oct. 28, 2021

Related U.S. Application Data

(63) Continuation of application No. PCT/JP2020/000076, filed on Jan. 6, 2020.

(30) Foreign Application Priority Data

Jan. 10, 2019 (JP) .................................. 2019-002976

(51) Int. Cl.
*H04W 72/02* (2009.01)
*H04W 72/0453* (2023.01)
(Continued)

(52) U.S. Cl.
CPC ....... *H04W 72/02* (2013.01); *H04W 72/0453* (2013.01); *H04W 72/30* (2023.01); *H04W 92/18* (2013.01)

(58) Field of Classification Search
CPC . H04W 72/02; H04W 72/0453; H04W 72/30; H04W 92/18; H04W 72/542;
(Continued)

(56) References Cited

U.S. PATENT DOCUMENTS 10,425,802 B2 * 9/2019 Fujishiro ............... H04W 92/18
2017/0118033 A1 * 4/2017 Srinivasan .......... H04L 41/0893
(Continued)

FOREIGN PATENT DOCUMENTS

WO 2016163472 A1 10/2016
WO 2020031346 A1 2/2020

OTHER PUBLICATIONS

Google Translation of CN201810912172.4, Chen, Taken Aug. 30, 2023, 2023.*
3rd Generation Partnership Project; Technical Specification Group Radio Access Network; NR; NR and NG-RAN Overall Description; Stage 2 (Release 15); 3GPP TS 38.300 V15.3.0 (Sep. 2018); pp. 1-92.
(Continued)

*Primary Examiner* — Afshawn M Towfighi
(74) *Attorney, Agent, or Firm* — Studebaker & Brackett PC

(57) ABSTRACT

A communication control method according to a first aspect is a method for controlling sidelink communication in a mobile communication system. The communication control method includes the steps of: broadcasting, by a base station of the mobile communication system, first resource information for indicating a carrier frequency or a radio resource pool utilizable in the sidelink communication; and transmitting, by the base station, first transmission type information associated with the first resource information. The first transmission type information is information for designating at least one of unicast, multicast, and broadcast as a transmission type in the sidelink communication using the carrier frequency or the radio resource pool.

4 Claims, 12 Drawing Sheets

(51) Int. Cl.
*H04W 72/30* (2023.01)
*H04W 92/18* (2009.01)

(58) Field of Classification Search
CPC ....... H04W 48/12; H04W 72/23; H04W 4/06; H04W 4/40; H04L 5/0094
See application file for complete search history.

(56) References Cited

U.S. PATENT DOCUMENTS

| | | |
|---|---|---|
| 2018/0124771 A1 | 5/2018 | Mok et al. |
| 2020/0221467 A1* | 7/2020 | Huang ................ H04W 72/542 |
| 2020/0236600 A1* | 7/2020 | Hong .................... H04L 5/0098 |
| 2021/0168763 A1* | 6/2021 | Cheng .................. H04W 72/20 |
| 2021/0168814 A1* | 6/2021 | Chen ..................... H04W 72/02 |
| 2021/0258853 A1* | 8/2021 | Wang ................ H04W 28/0268 |

OTHER PUBLICATIONS

Intel Corporation; "Summary for NR-V2X AI—7.2.4.1.4 Resource Allocation Mechanism"; 3GPP TSG RAN WG1 Meeting #95; R1-1813908; Nov. 12-16, 2018; pp. 1-14; Spokane, USA.

Fujitsu; "Resource Allocation for NR V2X Sidelink Communication" 3GPP TSG RAN WGI Meeting #95; R1-1812410; Nov. 12-16, 2018; pp. 1-10; Spokane, United States.

Intel Corporation; "Summary of offline discussion on NR-V2X AI—7.2.4.1.4 Resource Allocation Mechanism", 3GPP TSG RAN WG1 Meeting #94bis, R1-1811963; Oct. 8-12, 2018; Chengdu, China.

Samsung; "Discussion on Uu-based sidelink resource allocation and configuration", 3GPP TSG RAN WG1 #95; R1-1812989; Nov. 12-16, 2018; pp. 1-7; Spokane US.

\* cited by examiner

SIDELINK CONFIGURATION METHOD AND APPARATUS

RELATED APPLICATIONS

The present application is a continuation based on PCT Application No. PCT/JP2020/000076, filed on Jan. 6, 2020, which claims the benefit of Japanese Patent Application No. 2019-002976, filed on Jan. 10, 2019. The content of which is incorporated by reference herein in their entirety.

TECHNICAL FIELD

The present disclosure relates to a communication control method for controlling sidelink communication in a mobile communication system.

BACKGROUND ART

In the existing Long Term Evolution (LTE) system of the 3rd Generation Partnership Project (3GPP), sidelink communication is defined, the sidelink communication being communication directly performed using a sidelink that is an interface between user equipments. Furthermore, V2X sidelink communication obtained by applying the sidelink communication to Vehicle-to-everything (V2X) service is also defined.

In recent years, New Radio (NR) as the 5th generation (5G) radio access technology has been standardized in 3GPP (for example, see Non-Patent Literature 1). Although the sidelink communication is not defined in the specifications of current NR system, 3GPP has started to discuss the introduction of the sidelink communication (in particular, V2X sidelink communication) into the NR system.

CITATION LIST

Non-Patent Literature

Non-Patent Literature 1: 3GPP Technical Specification "TS38.300 V15.3.0", September 2018, INTERNET<URL: http://www.3gpp.org/ftp//Specs/archive/38_series/38.300/38300430.zip>

SUMMARY

A communication control method according to a first aspect is a method comprising: broadcasting, by a base station, a system information block including resource information related to a carrier frequency utilizable in sidelink communication; and transmitting, by user equipment to the base station, a sidelink UE information message for requesting individual allocation of a radio resource for the sidelink communication, which includes information indicating a carrier frequency which the user equipment desires to apply to the sidelink communication, based on the resource information. The sidelink UE information message includes, as transmission type corresponding to the radio resource requesting individual allocation, information indicating at least one of unicast, groupcast, and broadcast.

A user equipment according to a second aspect comprises: a receiver configured to receive, from a base station, a system information block including resource information related to a carrier frequency utilizable in sidelink communication; and a transmitter configured to transmit, to the base station, a sidelink UE information message for requesting individual allocation of a radio resource for the sidelink communication, which includes information indicating a carrier frequency which the user equipment desires to apply to the sidelink communication, based on the resource information. The sidelink UE information message includes, as transmission type corresponding to the radio resource requesting individual allocation, information indicating at least one of unicast, groupcast, and broadcast.

A chipset according to a third aspect is for controlling a user equipment. The chipset comprises: a processor and a memory coupled to the processor. The processor is configured to: receive, from a base station, a system information block including resource information related to a carrier frequency utilizable in sidelink communication; and transmit, to the base station, a sidelink UE information message for requesting individual allocation of a radio resource for the sidelink communication, which includes information indicating a carrier frequency which the user equipment desires to apply to the sidelink communication, based on the resource information. The sidelink UE information message includes, as transmission type corresponding to the radio resource requesting individual allocation, information indicating at least one of unicast, groupcast, and broadcast.

DESCRIPTION OF EMBODIMENTS

Figure 1:
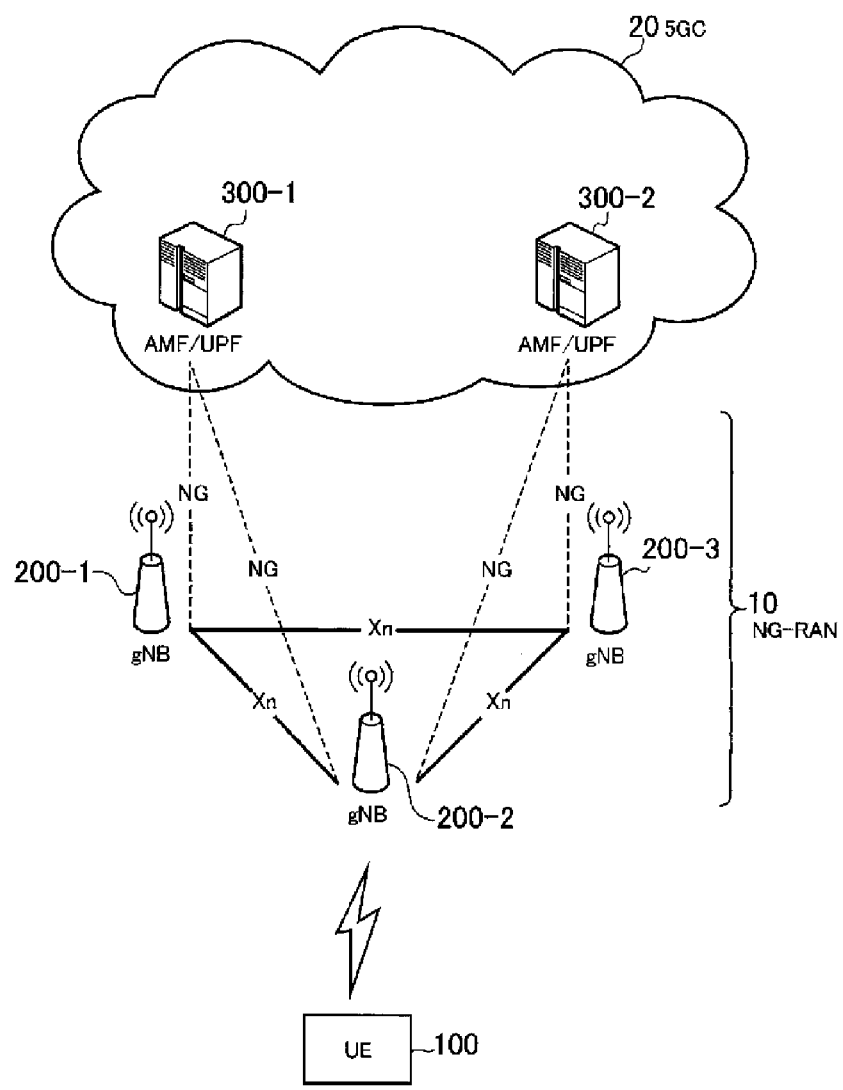
FIG. 1 is a diagram illustrating a configuration of a mobile communication system according to an embodiment.

It is assumed that NR sidelink communication is defined based on LTE sidelink communication, and has additional advanced functions that are not included in the LTE sidelink communication. It is assumed that examples of the additional advanced functions include a function of retransmission control using delivery confirmation, and a function of multicast in addition to unicast and broadcast are added.

Accordingly, the present disclosure makes it possible to appropriately control NR sidelink communication.

A mobile communication system according to an embodiment will be described with reference to the drawings. In the descriptions of the drawings, the same or similar parts are given the same or similar reference numerals.

Mobile Communication System

First, a configuration of a mobile communication system according to an embodiment will be described. Although the mobile communication system according to the embodiment is a 5G system of 3GPP, LTE may be at least partially applied to the mobile communication system.

FIG. 1 is a diagram illustrating a configuration of the mobile communication system according to the embodiment.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a movable apparatus. The UE 100 may be any apparatus as long as the UE is utilized by a user. Examples of the UE 100 include a mobile phone terminal (including a smartphone), a tablet terminal, a notebook PC, a communication module (including a communication card or chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNB 200 is also referred to as an NG-RAN node in some cases. The gNBs 200 are connected to each other via an Xn interface which is an inter-base station interface. The gNB 200 manages one or a plurality of cells. The gNB 200 performs wireless communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a wireless communication area. The "cell" is also used as a term to indicate a function or a resource for performing wireless communication with the UE 100. One cell belongs to one carrier frequency.

Note that the gNB may be connected to the Evolved Packet Core (EPC), which is a core network of LTE, or a base station of LTE may be connected to the 5GC. Moreover, the base station of LTE and the gNB may be connected via the inter-base station interface.

In the following, a case in which the gNB 200 performs wireless communication with the UE 100 is mainly described, but an eNB may perform wireless communication with the UE 100 and control sidelink communication.

The 5GC 20 includes an Access and Mobility Management Function (AMF) and User Plane Function (UPF) 300. The AMF performs various kinds of mobility control and the like for the UE 100. The AMF manages information of the area in which the UE 100 exists by communicating with the UE 100 by using Non-Access Stratum (NAS) signaling. The UPF performs data transfer control. The AMF and UPF are connected to the gNB 200 via an NG interface, which is an interface between the base station and the core network.

Figure 2:
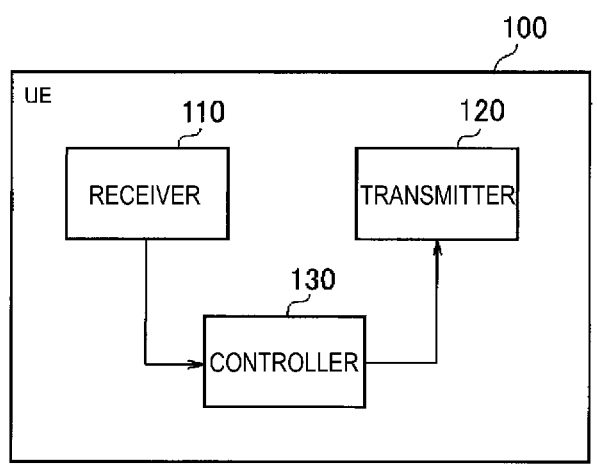
FIG. 2 is a diagram illustrating a configuration of a user equipment according to the embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of reception under the control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmission under the control of the controller 130. The transmitter 120 includes an antenna and a transmission device. The transmission device converts a baseband signal (transmission signal) output by the controller 130 into a radio signal and transmits the resulting signal through the antenna.

The controller 130 performs various kinds of control in the UE 100. The controller 130 includes at least one processor and at least one memory electrically connected to the processor. The memory stores a program executed by the processor and information used for processing by the processor. The processor may include a baseband processor and a Central Processing Unit (CPU). The baseband processor performs modulation and demodulation, and coding and decoding of a baseband signal, and the like. The CPU executes the program stored in the memory and performs various kinds of processing.

Figure 3:
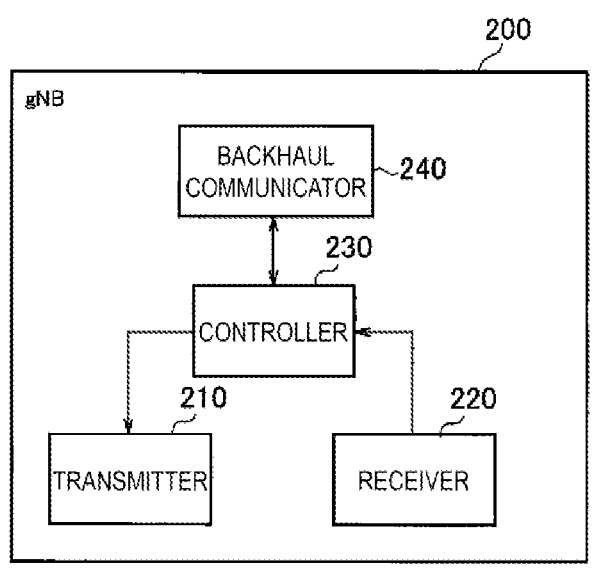
FIG. 3 is a diagram illustrating a configuration of a base station according to the embodiment.

FIG. 3 is a diagram illustrating a configuration of the gNB 200 (base station).

As illustrated in FIG. 3, the gNB 200 includes a transmitter 210, a receiver 220, a controller 230, and a backhaul communication unit 240.

The transmitter 210 performs various kinds of transmission under the control of the controller 230. The transmitter 210 includes an antenna and a transmission device. The transmission device converts a baseband signal (transmission signal) output by the controller 230 into a radio signal and transmits the resulting signal through the antenna.

The receiver 220 performs various kinds of reception under the control of the controller 230. The receiver 220 includes an antenna and a reception device. The reception device converts a radio signal received through the antenna into a baseband signal (reception signal) and outputs the resulting signal to the controller 230.

The controller 230 performs various kinds of control in the gNB 200. The controller 230 includes at least one processor and at least one memory electrically connected to the processor. The memory stores a program executed by the processor and information used for processing by the processor. The processor may include a baseband processor and a CPU. The baseband processor performs modulation and demodulation, and coding and decoding of a baseband signal, and the like. The CPU executes the program stored in the memory and performs various kinds of processing.

The backhaul communication unit 240 is connected to the neighboring base station via the inter-base station interface. The backhaul communication unit 240 is connected to the AMF/UPF 300 via the interface between the base station and the core network. Note that the gNB may include a Central Unit (CU) and a Distributed Unit (DU) (i.e., each unit performs a separate function), and both the units may be connected via an F1 interface.

Figure 4:
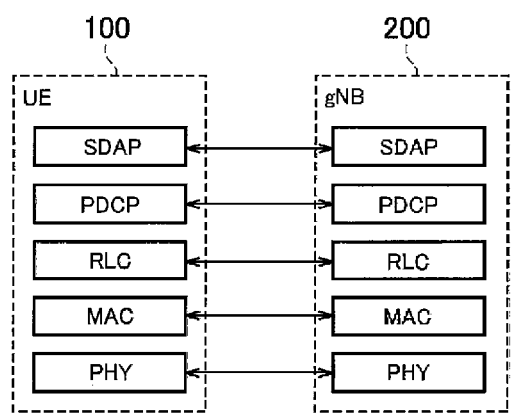
FIG. 4 is a diagram illustrating a configuration of a protocol stack of a radio interface of a user plane according to the embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a Medium Access Control (MAC) layer, and a Radio Link Control (RLC) layer, a Packet Data Convergence Protocol (PDCP) layer, and a Service Data Adaptation Protocol (SDAP) layer.

The PHY layer performs coding and decoding, modulation and demodulation, mapping and demapping of antenna, and mapping and demapping of resource. Between the PHY layer of the UE 100 and the PHY layer of the gNB 200, data and control information are transmitted via a physical channel.

The MAC layer performs priority control of data, retransmission processing by a hybrid ARQ (HARQ), random access procedure, and the like. Between the MAC layer of the UE 100 and the MAC layer of the gNB 200, data and control information are transmitted via a transport channel. The MAC layer of the gNB 200 includes a scheduler. The scheduler determines a transport format (a transport block size, a modulation and coding scheme (MCS)) of an uplink and a downlink and an allocation resource block for the UE 100.

The RLC layer uses the functions of the MAC layer and the PHY layer and transmits data to the RLC layer on the reception side. Between the RLC layer of the UE 100 and the RLC layer of the gNB 200, data and control information are transmitted via a logical channel.

The PDCP layer performs header compression and expansion, and encryption and decryption.

The SDAP layer performs mapping between an IP flow which is a unit of QoS control by the core network performs and a radio bearer which is a unit of QoS control by an Access Stratum (AS). Note that when the RAN is connected to the EPC, the SDAP need not be provided.

Figure 5:
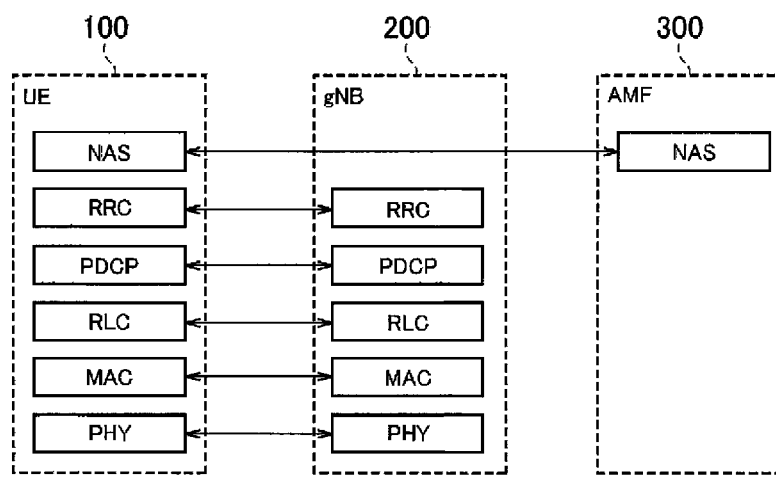
FIG. 5 is a diagram illustrating a configuration of a protocol stack of a radio interface of a control plane according to the embodiment.

FIG. 5 is a diagram illustrating a configuration of a protocol stack of a radio interface of a control plane for handling signaling (control signal).

As illustrated in FIG. 5, the protocol stack of the radio interface of the control plane has a Radio Resource Control (RRC) layer and a Non-Access Stratum (NAS) layer instead of the SDAP layer illustrated in FIG. 4.

Between the RRC layer of the UE 100 and the RRC layer of the gNB 200, RRC signaling for various configurations is transmitted. The RRC layer controls the logical channel, the transport channel, and the physical channel in response to establishment, re-establishment, and release of the radio bearer. When there is a connection (RRC connection) between the RRC of the UE 100 and the RRC of the gNB 200, the UE 100 is in an RRC connected mode. When there is no connection (RRC connection) between the RRC of the UE 100 and the RRC of the gNB 200, the UE 100 is in an RRC idle mode. Furthermore, when the RRC connection is suspended, the UE 100 is in an RRC inactive mode.

The NAS layer higher than the RRC layer performs session management, mobility management, and the like. Between the NAS layer of the UE 100 and the NAS layer of the AMF 300, NAS signaling is transmitted.

Note that the UE 100 has an application layer and the like other than the protocol of the radio interface.

Sidelink Communication

The mobile communication system according to the embodiment supports sidelink communication, the side link communication being communication directly performed using a sidelink which is an interface between the UEs. The sidelink communication may be the V2X sidelink communication. Note that the sidelink may also be referred to as a PC5 interface.

The protocol stack of the sidelink communication has the physical layer, the MAC layer, the RLC layer, and the PDCP layer. The protocol stack of the sidelink communication may have the RRC layer in the control plane.

Figure 6:
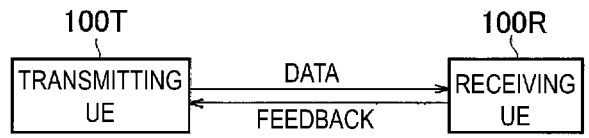
FIG. 6 is a diagram illustrating transmission types of sidelink communication according to the embodiment.
Figure 6:
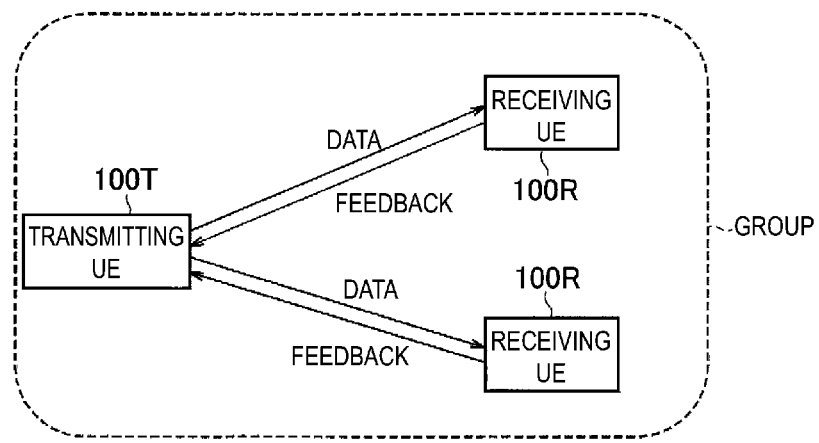
Figure 6:
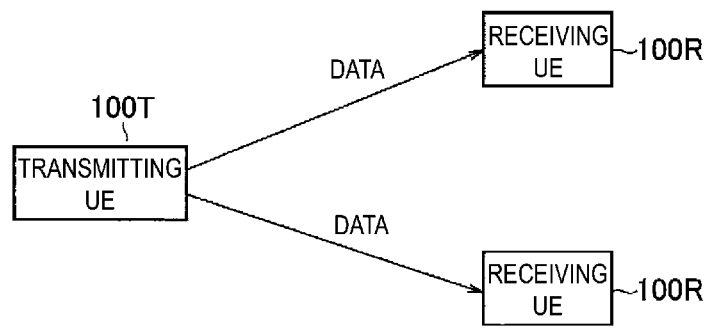

FIG. 6 is a diagram illustrating transmission types of sidelink communication according to the embodiment.

As illustrated in FIG. 6, the transmission type of the sidelink communication includes unicast, multicast, and broadcast. In addition, feedback from a receiving UE 100R to a transmitting UE 100T may be introduced into the sidelink communication.

The feedback includes response information indicating whether or not the receiving UE 100R has correctly received data from the transmitting UE 100T. The feedback may include channel state information (CSI) indicating the state of a propagation channel between the transmitting UE 100T and the receiving UE 100R.

The response information may be response information of an Automatic repeat-request (ARQ) of the RLC layer, or may be response information of a Hybrid ARQ (HARQ) of the MAC layer. The response information includes ACK indicating that the data has been correctly received and NACK indicating that the data has not been correctly received (i.e., data reception has failed).

The unicast sidelink communication is one-to-one sidelink communication. The transmitting UE 100T transmits data to the receiving UE 100R, and the receiving UE 100R transmits feedback information to the transmitting UE 100T.

Note that the transmitting UE 100T transmits control information for sidelink communication to the receiving UE 100R prior to transmission of the data.

The multicast sidelink communication is one-to-many (one-to-specified large number) sidelink communication performed within a specific group. The multicast may also be referred to as a groupcast. The transmitting UE 100T transmits data to the receiving UEs 100R in the group, and each of the receiving UEs 100R transmits feedback information to the transmitting UE 100T.

Broadcast sidelink communication is one-to-unspecified large number sidelink communication. The transmitting UE 100T transmits data without designating a specific destination UE or group.

First Embodiment

Next, a first embodiment will be described with the assumption of the mobile communication system and the sidelink communication described above.

In the first embodiment, the gNB 200 broadcasts first resource information indicating a carrier frequency or a radio resource pool utilizable for sidelink communication. The radio resource pool refers to a resource group including some of radio resources (time and frequency resources) within the carrier frequency. The radio resource pool may be some of bandwidth parts (BWPs) within the carrier frequency. As the radio resource pool, a radio resource pool for transmission and a radio resource pool for reception in the sidelink communication may be separately defined.

Furthermore, the gNB 200 transmits first transmission type information associated with the first resource information. The first transmission type information is information for designating any of unicast, multicast, and broadcast as a transmission type in the sidelink communication using the carrier frequency or the radio resource pool.

This allows the transmission type in the sidelink communication to be different for each carrier frequency or for each radio resource pool, so the sidelink communication using an optimum carrier frequency or radio resource pool for each transmission type is easily implemented.

For example, it becomes easier to implement an operation that allows subcarrier spacings to be different between the radio resource pool for unicast and the radio resource pool for multicast. In this case, the gNB 200 may transmit subcarrier spacing information associated with the first resource information. The subcarrier spacing information is information indicating subcarrier spacing of the corresponding carrier frequency or radio resource pool. The gNB 200 may transmit the subcarrier spacing information in addition to or instead of transmission of the first transmission type information.

In the first embodiment, the gNB 200 may include the first resource information and the first transmission type information in one system information block (SIB) and broadcast the one SIB. The one SIB may be a dedicated SIB used for NR sidelink communication. The gNB 200 may further include the subcarrier spacing information in the SIB. The SIB is receivable by the UE 100 in the RRC idle mode or in the RRC inactive mode, thus facilitating the sidelink communication by the UE 100 in the RRC idle mode and in the RRC inactive mode.

Alternatively, the gNB 200 may broadcast the first resource information by the SIB and transmit the first transmission type information in a unicast message (e.g., an RRC message). In this case, the UE 100 may be in the RRC connected mode.

In the first embodiment, the UE 100 having received the first resource information and the first transmission type information from the gNB 200 may make a request to the gNB 200 for individual allocation of a radio resource for sidelink communication on the basis of at least one of the first resource information or the first transmission type information. In this case, the UE 100 may be in the RRC connected mode. The UE 100 may make such a request by an RRC message.

This RRC message may be a sidelink UE information message that can be transmitted by the UE 100 in the RRC connected mode. Alternatively, the RRC message may be a message (RRC Request) for the UE 100 to transition from the RRC idle mode to the RRC connected mode, a message (RRC Resume Request) for the UE 100 to transition from the RRC inactive mode to the RRC connected mode, and/or a message (RRC Re-establishment) for the UE 100 which has detected radio link failure to perform reconnection.

When making the request to the gNB 200 for individual allocation of a radio resource for sidelink communication, the UE 100 may transmit second transmission type information to the gNB 200 on the basis of the first transmission type information. The second transmission type information is information for indicating any of unicast, multicast, and broadcast as a transmission type that the UE 100 desires to apply to sidelink communication. This allows the UE 100 to request the gNB 200 to allocate a radio resource (time and frequency resource) included in a carrier frequency or a radio resource pool that is suitable for the transmission type desired by the UE itself, among the transmission types utilizable by the UE itself.

Additionally, when making the request to the gNB 200 for individual allocation of a radio resource for sidelink communication, the UE 100 may transmit second resource information to the gNB 200 on the basis of the first resource information. The second resource information indicates a carrier frequency or a radio resource pool for which the individual allocation of the radio resource is requested. This allows the UE 100 to notify the gNB 200 of the carrier frequency or the radio resource pool that is suitable for the transmission type desired by the UE itself, making it easier for the gNB 200 to allocate a suitable radio resource (time and frequency resource).

Here, the second resource information (carrier frequency or radio resource pool) notified from the UE 100 to the gNB 200 may suggest the carrier frequency or the transmission type supported by the UE 100. Specifically, the gNB 200 identifies a carrier frequency or a transmission type supported by the UE 100 on the basis of the carrier frequency or the radio resource pool notified from the UE 100.

Alternatively, when making the request to the gNB 200 for individual allocation of a radio resource for sidelink communication, the UE 100 may not transmit the second resource information to the gNB 200. The second resource information indicates a carrier frequency or a radio resource pool for which the individual allocation of the radio resource is requested. In this case, the UE 100 transmits the second transmission type information indicating the transmission type desired to be applied to the sidelink communication to the gNB 200. The gNB 200 may assume that, as long as the carrier frequency or the radio resource pool corresponds to the transmission type desired by the UE 100, any carrier frequency or any radio resource pool is supported by the UE 100.

Note that the UE 100 having received the first resource information and the first transmission type information from the gNB 200 may select a radio resource (time and frequency resource) from the carrier frequency or the radio resource pool corresponding to the transmission type desired by the UE itself, and may autonomously perform sidelink communication. In this case, the UE 100 may be in the RRC idle mode or the RRC inactive mode.

Furthermore, the UE 100 in the RRC idle mode or the RRC inactive mode may perform cell reselection control such that cell reselection of a cell belonging to the carrier frequency corresponding to the transmission type desired by the UE itself is performed, on the basis of the first resource information and the first transmission type information received from the gNB 200. For example, the UE 100 preferentially selects, by configuring a carrier frequency corresponding to the transmission type desired by the UE itself to a frequency having the highest priority of cell reselection, a cell belonging to the carrier frequency as a serving cell.

Figure 7:
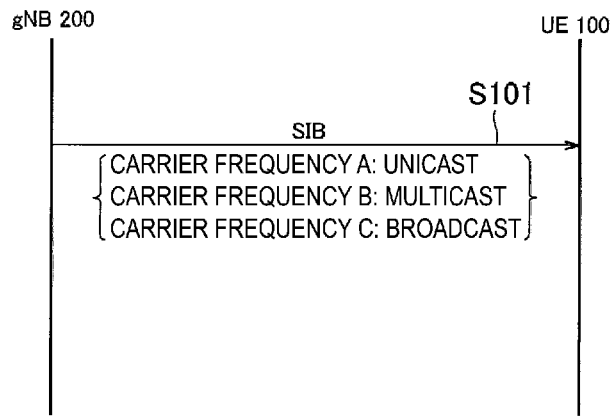
FIG. 7 is a diagram illustrating a specific example 1 of an operation according to a first embodiment.
Figure 7:
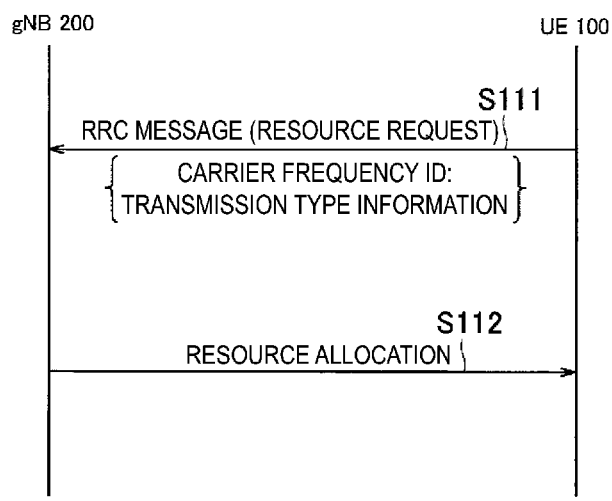

FIG. 7 is a diagram illustrating a specific example 1 of an operation according to the first embodiment.

As illustrated in FIG. 7, in step S101, the gNB 200 broadcasts an SIB including an identifier of a carrier frequency (first resource information) and information for designating a transmission type in sidelink communication using the carrier frequency (first transmission type information).

Here, a list including one or a plurality of carrier frequency identifiers may be included in the SIB. The first transmission type information may be associated with each entry (identifier) in the list.

In FIG. 7, an example is illustrated in which the unicast is associated with a carrier frequency A, the multicast is associated with a carrier frequency B, and the broadcast is associated with a carrier frequency C. Note that a plurality of transmission types may be associated with one carrier frequency.

In step S111, the UE 100 having received the first resource information and the first transmission type information from the gNB 200 may make a request to the gNB 200 for individual allocation of a radio resource for sidelink communication on the basis of the first resource information and the first transmission type information. The UE 100 may make such a request by an RRC message. Hereinafter, this message is referred to as a resource request message.

In FIG. 7, an example is illustrated in which the UE 100 includes an identifier (second resource information) of the carrier frequency corresponding to the transmission type desired by the UE itself among carrier frequencies notified from the gNB 200, in the resource request message. Additionally, illustrated is an example in which the UE 100 includes the second transmission type information indicating the transmission type desired by the UE itself in the resource request message. For example, in the above-described example, the UE 100 desiring multicast sidelink communication includes the identifier of the carrier frequency B and transmission type information indicating the multicast in the resource request message.

In step S112, the gNB 200 allocates, to the UE 100, a radio resource for sidelink communication (time and frequency resource) included in the carrier frequency corresponding to the transmission type desired by the UE 100 on the basis of the resource request message from the UE 100. The gNB 200 may perform such a resource allocation by either a Physical Downlink Control Channel (PDCCH) or a unicast RRC message (dedicated RRC message).

Figure 8:
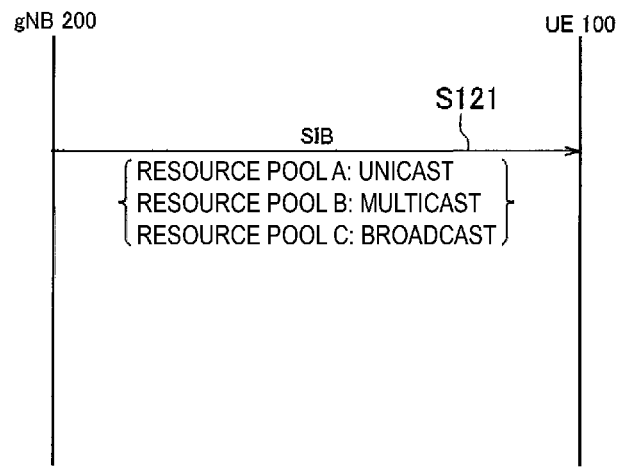
FIG. 8 is a diagram illustrating a specific example 2 of the operation according to the first embodiment.
Figure 8:
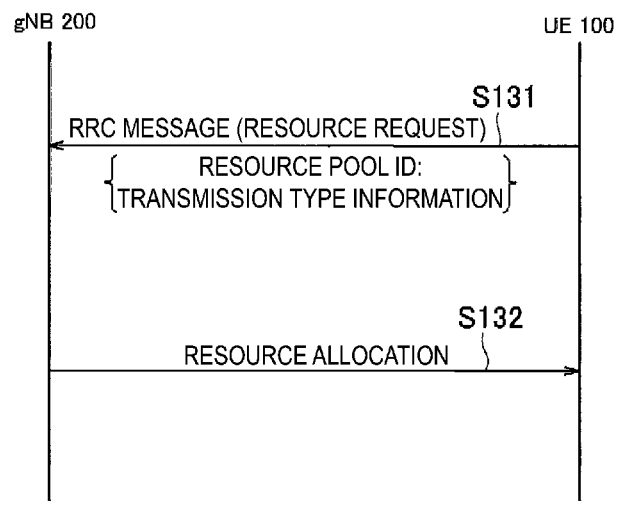

FIG. 8 is a diagram illustrating a specific example 2 of the operation according to the first embodiment.

As illustrated in FIG. 8, in step S121, the gNB 200 broadcasts an SIB including an identifier of a radio resource pool (first resource information) and information for designating a transmission type in sidelink communication using the radio resource pool (first transmission type information).

Here, a list including one or a plurality of resource areas and identifiers of radio resource pools may be included in the SIB. The first transmission type information may be associated with each entry in this list.

In FIG. 8, an example is illustrated in which the unicast is associated with a radio resource pool A, the multicast is associated with a radio resource pool B, and the broadcast is associated with a radio resource pool C. Note that a plurality of transmission types may be associated with one radio resource pool.

In step S131, the UE 100 having received the first resource information and the first transmission type information from the gNB 200 may make a request to the gNB 200 for individual allocation of a radio resource for sidelink communication on the basis of the first resource information and the first transmission type information.

In FIG. 8, an example is illustrated in which the UE 100 includes an identifier (second resource information) of the radio resource pool corresponding to the transmission type desired by the UE itself among radio resource pools notified from the gNB 200, in the resource request message. Additionally, illustrated is an example in which the UE 100 includes the second transmission type information indicating the transmission type desired by the UE itself in the resource request message. For example, in the above-described example, the UE 100 desiring multicast sidelink communication includes the identifier of the radio resource pool B and transmission type information indicating the multicast in the resource request message.

In step S132, the gNB 200 allocates, to the UE 100, a radio resource for sidelink communication (time and frequency resource) included in the radio resource pool corresponding to the transmission type desired by the UE 100 on the basis of the resource request message from the UE 100. The gNB 200 may perform such a resource allocation by either a PDCCH or a unicast RRC message (dedicated RRC message).

Modification 1 of First Embodiment

In the above-described first embodiment, an example in which the radio resource pool can be a BWP has been described. However, the radio resource pool may be a resource group including some radio resources (time and frequency resources) included in the BWP.

In this case, a set of the radio resource pool and the BWP may be configured, and the radio resource pool may be associated with the BWP. Specifically, the radio resource pool is defined in the BWP configured for the UE 100.

The BWP is configured by the gNB 200 for the UE 100. For example, the gNB 200 configures an Initial BWP by an SIB for the UE 100 and additionally and individually configures other BWPs for the UE 100. The gNB 200 can variably configure subcarrier spacing and a cyclic prefix for each BWP additionally and individually configured for the UE 100. Additionally, switching from one BWP to another BWP is controlled by the gNB 200. For example, when a first BWP and a second BWP are configured for the UE 100 and the first BWP is active and the second BWP is inactive, the gNB 200 switches the active BWP from the first BWP to the second BWP.

Here, a radio resource pool corresponding to the active BWP may be active (usable) and a resource pool corresponding to the inactive BWP may be inactive (unusable). That is, active/inactive of the radio resource pool may be linked with active/inactive of the BWP.

Alternatively, a set of the radio resource pool and the BWP may not be configured, and the radio resource pool may be configured independently of the BWP. In this case, the radio resource pool may be configured in the BWP, may be configured outside the BWP, or may be configured across the boundary of the BWPs.

Here, when a radio resource pool at least partially overlaps with the BWP, active/inactive of the BWP can be linked with active/inactive of the radio resource pool at least partially overlapping with this BWP. Alternatively, active/inactive of the radio resource pool may not be linked with active/inactive of the BWP. Even if the BWP is inactive, as long as a radio resource pool is configured, the radio resource pool (frequency resource) may be made usable.

Modification 2 of First Embodiment

In the above-described first embodiment, the one example has been described which allows the gNB 200 to broadcast, as the first resource information, a list including identifiers of carrier frequencies utilizable for sidelink communication, by using SIB. The list may include an identifier of a neighboring carrier frequency different from the carrier frequency of the cell of the gNB 200. In other words, the UE 100 receives, from the serving cell, a list including the identifier of the neighboring carrier frequency different from the carrier frequency of the serving cell.

In addition, the gNB 200 may broadcast, by the SIB, in addition to an identifier of a neighboring carrier frequency utilizable for sidelink communication, information for indicating a BWP utilizable for sidelink communication within the neighboring carrier frequency. This allows the UE 100 to recognize not only a neighboring carrier frequency utilizable for sidelink communication, but also a BWP utilizable for sidelink communication within the neighboring carrier frequency, on the basis of the SIB received from the serving cell.

For example, when the UE 100 receives (sidelink reception) data transmitted from another UE 100 that exists in a neighboring cell belonging to a neighboring carrier frequency, even if an SIB provided in the neighboring cell is not received, inter-frequency sidelink reception can be efficiently performed on the basis of the SIB (BWP information) from the serving cell.

In addition, the UE 100 recognizes a BWP and recognizes the properties (subcarrier spacing and a cyclic prefix) of the BWP. This allows the UE 100 to identify a BWP suitable for a Quality of Service (QoS) property of the sidelink communication desired by the UE itself, and determine, on the basis of the identified BWP, the necessity of the inter-frequency sidelink reception and the necessity of the resource request to the gNB 200. Such a resource request is described in a modification 5 of the first embodiment.

Modification 3 of First Embodiment

In the above-described first embodiment, the gNB 200 may transmit, to the UE 100, PDCP packet duplication-related information to be applied to sidelink communication in association with the first resource information.

In the PDCP packet duplication, the UE 100 transmits, on a sidelink, an identical PDCP packet redundantly in a plurality of independent transmission paths. For example, in the transmitting UE 100T, an identical PDCP PDU is transmitted by a primary RLC entity (primary transmission), and is transmitted by a secondary RLC entity (secondary transmission).

In the present modification, by using radio resource pools different from each other in the primary transmission and the secondary transmission, independent transmission paths increase the reliability. When the PDCP packet duplication in the UE 100 is active, the gNB 200 transmits (configures), to (for) the UE 100, information related to the primary transmission and the secondary transmission in association with the radio resource pool. Specifically, the gNB 200 configures, for the UE 100, a first radio resource pool for the primary transmission and a second radio resource pool for the secondary transmission.

For example, the gNB 200 may transmit, to the UE 100, information indicating that the radio resource pool is usable or unusable for the secondary transmission in association with the radio resource, by a dedicated RRC message or an SIB. The gNB 200 may transmit, to the UE 100, information indicating that the radio resource pool is usable or unusable for the primary transmission in association with the radio resource, by a dedicated RRC message or an SIB.

Furthermore, the gNB 200 may configure, for the UE 100, a radio resource pool for the primary transmission and a radio resource pool for the secondary transmission, by a dedicated RRC message. The gNB 200 may include, in association with each radio resource pool included in an SIB, in the SIB, information indicating whether the radio resource pool is for the primary transmission or for the secondary transmission.

In the present modification, the one example has been described which allows the radio resource pools different from each other to be used in the primary transmission and the secondary transmission, and carrier frequencies (cells) different from each other may be used in the primary transmission and the secondary transmission. In this case, the radio resource pool in the present modification may be replaced with the carrier frequency.

Modification 4 of First Embodiment

In the above-described first embodiment, the gNB 200 may transmit, to the UE 100, information indicating the upper limit of the amount of transmission data in sidelink communication in association with the first resource information, by a dedicated RRC message or an SIB. The information indicating the upper limit of the amount of transmission data is information that indicates, for example, an upper limit not greater than 200 bytes per transmission or an upper limit of a bit rate not greater than 200 bps. This allows the UE 100 to select a radio resource pool (or carrier frequency) suitable for the amount of data transmitted by the UE itself and use the radio resource pool for sidelink communication.

Alternatively, the gNB 200 may transmit, to the UE 100, information indicating a category of the size of transmission data in sidelink communication in association with the first resource information, by a dedicated RRC message or an SIB. The information indicating the category of the size of transmission data is information such as small packet transmission or large packet transmission. This allows the UE 100 to select a radio resource pool (or carrier frequency) suitable for the size of data transmitted by the UE itself and use the radio resource pool for sidelink communication.

Modification 5 of First Embodiment

In the above-described first embodiment, the example has been described which allows the second transmission type information indicating the transmission type that the UE 100 desires to apply to sidelink communication to be included in the resource allocation request transmitted from the UE 100 to the gNB 200.

However, the resource allocation request may include at least one piece of information among 1) information indicating subcarrier spacing that the UE 100 desires to apply to sidelink communication, 2) information indicating a BWP that the UE 100 desires to apply to sidelink communication, 3) information indicating whether or not the UE 100 desires to apply PDCP packet duplication to sidelink communication, 4) information indicating a radio resource pool that the UE 100 desires to apply to primary transmission or secondary transmission, and 5) information indicating the amount (size) of data that the UE 100 desires to transmit in sidelink communication.

This allows the gNB 200 to perform resource allocation suitable for the situation of the UE 100.

Note that the UE 100 may transmit these pieces of information to the gNB 200 on the basis of the SIB or the dedicated RRC message from the gNB 200, or may spontaneously transmit these pieces of information to the gNB 200 not based on either the SIB or the dedicated RRC message from the gNB 200.

Second Embodiment

Next, a second embodiment will be described while focusing on differences from the above-described first embodiment.

In the first embodiment, the example has been described which allows the resource allocation request transmitted from the UE 100 to the gNB 200 to be an RRC message. The RRC message is transmitted by a Physical Uplink Shared Channel (PUSCH) allocated by the gNB 200 for the UE 100. However, such a method requires a PUSCH resource to be allocated by the gNB 200 for the UE 100.

In the second embodiment, the resource allocation request is transmitted by a Physical Uplink Control Channel (PUCCH) or a Physical Random Access Channel (PRACH). This allows, even if no PUSCH resource is allocated by the gNB 200 for the UE 100, the UE 100 to make a request to the gNB 200 for individual allocation of a radio resource for sidelink communication.

In the second embodiment, the UE 100 makes a request to the gNB 200 for individual allocation of a radio resource for sidelink communication via the PUCCH or the PRACH. Here, the UE 100 notifies the gNB 200 of any of unicast, multicast, and broadcast as a transmission type that the UE itself desires to apply to sidelink communication. This allows the UE 100 to make a request to the gNB 200 for individual allocation of a radio resource suitable for the transmission type that the UE itself desires to apply to sidelink communication.

Figure 9:
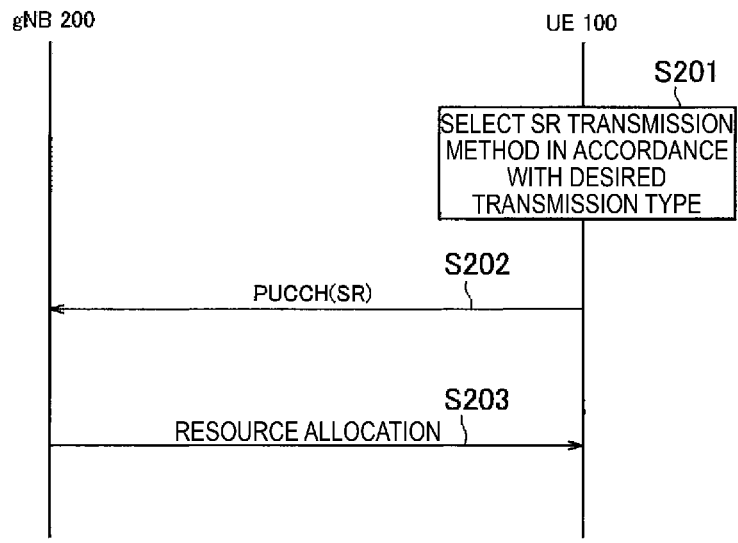
FIG. 9 is a diagram illustrating a specific example 1 of an operation according to a second embodiment.

FIG. 9 is a diagram illustrating a specific example 1 of an operation according to the second embodiment. In the present operation example, radio resources (time and frequency resources) or signal formats for a scheduling request (SR) are different between the unicast, the multicast, and the broadcast. A signal sequence may be included in the signal format. Note that the SR is a kind of uplink control information (UCI) transmitted on the PUCCH.

A mapping between the radio resource or the signal format for the SR and the transmission type may be broadcast from the gNB 200 by the SIB, may be notified to the UE 100 by a dedicated RRC message from the gNB 200, or may be preconfigured in the UE 100.

As illustrated in FIG. 9, in step S201, the UE 100 selects an SR transmission method (radio resource or signal format) corresponding to a transmission type that the UE itself desires to apply to sidelink communication on the basis of the correspondence relationship described above.

In step S202, the UE 100 transmits an SR on the PUCCH to the gNB 200 by the SR transmission method selected in step S201. The gNB 200 having received the SR identifies a transmission type that the UE 100 desires to apply to sidelink communication, on the basis of the radio resource or the signal format used for transmission of the SR.

In step S203, the gNB 200 allocates, to the UE 100, a radio resource for sidelink communication (time and frequency resource) corresponding to the transmission type desired by the UE 100 on the basis of the SR from the UE 100. The gNB 200 may perform such a resource allocation by either a PDCCH or a unicast RRC message (dedicated RRC message).

Figure 10:
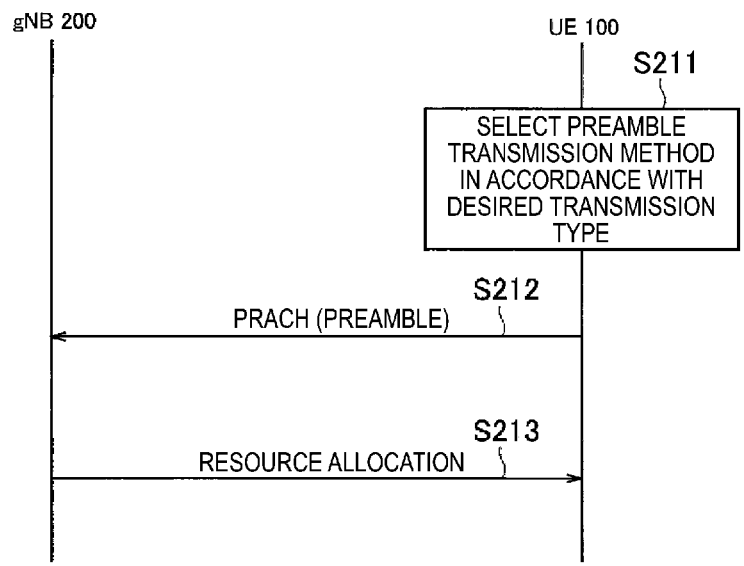
FIG. 10 is a diagram illustrating a specific example 2 of the operation according to the second embodiment.

FIG. 10 is a diagram illustrating a specific example 2 of the operation according to the second embodiment. In the present operation example, radio resources (time and frequency resources) or signal formats for a random access preamble are different between the unicast, the multicast, and the broadcast. The random access preamble is a signal transmitted on the PRACH.

A mapping between the radio resource or the signal format for the random access preamble and the transmission type may be broadcast from the gNB 200 by the SIB, may be notified to the UE 100 by a dedicated RRC message from the gNB 200, or may be preconfigured in the UE 100.

As illustrated in FIG. 10, in step S211, the UE 100 selects a random access preamble transmission method (radio resource or signal format) corresponding to a transmission type that the UE itself desires to apply to sidelink communication on the basis of the mapping described above.

In step S212, the UE 100 transmits the random access preamble on the PRACH to the gNB 200 by the random access preamble transmission method selected in step S211. The gNB 200 having received the random access preamble identifies a transmission type that the UE 100 desires to apply to sidelink communication, on the basis of the radio resource or the signal format used for transmission of this random access preamble.

In step S213, the gNB 200 allocates, to the UE 100, a radio resource for sidelink communication (time and frequency resource) corresponding to the transmission type desired by the UE 100 on the basis of the random access preamble from the UE 100. The gNB 200 may perform such a resource allocation by either a PDCCH or a unicast RRC message (dedicated RRC message).

Third Embodiment

Next, a third embodiment will be described while focusing on differences from the above-described embodiments. The third embodiment is an embodiment related to ACK/NACK feedback from the receiving UE 100R to the transmitting UE 100T in sidelink communication.

In the third embodiment, the receiving UE 100R receives data from the transmitting UE 100T through sidelink communication. Furthermore, the receiving UE 100R periodically transmits a sidelink signal for quality measurement (hereinafter referred to as a "quality measurement signal") for sidelink communication. The quality measurement signal is a signal transmitted by each UE 100 for CSI measurement, and may be referred to as a discovery signal or a CSI reference signal. The quality measurement signal may include an identity of a transmission source UE of the quality measurement signal.

In the third embodiment, the receiving UE 100R transmits a quality measurement signal including response information indicating whether or not data from the transmitting UE 100T has been correctly received. The response information may be response information of an ARQ of the RLC layer, or may be response information of an HARQ of the MAC layer. The response information includes ACK indicating that the data has been correctly received and NACK indicating that the data has not been correctly received (i.e., data reception has failed). Note that the receiving UE 100R may perform only NACK transmission without performing ACK transmission.

This makes it possible to carry the response information of the sidelink communication by the quality measurement signal without newly introducing a signal or a channel for response information of the sidelink communication, thus allowing the delivery confirmation of the sidelink communication to be introduced while saving radio resources.

In the third embodiment, the transmitting UE 100T having received the quality measurement signal including the response information retransmits data that the receiving UE 100R has not been able to correctly receive (i.e., data that the receiving UE 100R has failed to receive) on the basis of this response information. This makes it possible to improve the reliability of the sidelink communication.

The receiving UE 100R may determine whether or not all the data from the transmitting UE 100T have been correctly received in a period from the time of transmission of the previous quality measurement signal to the time of transmission of the current quality measurement signal.

Then, when it is determined that at least part of the data has not been able to be correctly received from the transmitting UE 100T in this period, the receiving UE 100R may transmit the NACK as the response information included in the current quality measurement signal. The NACK may be a 1-bit flag.

This makes it possible to reduce the amount of response information to be included in the quality measurement signal. On the other hand, when it is determined that all the data have been able to be correctly received from the transmitting UE 100T in this period, the receiving UE 100R may not include the response information in the quality measurement signal of this time.

In this case, upon receiving the quality measurement signal including the NACK, in accordance with the reception of this NACK, the transmitting UE 100T may retransmit all the data transmitted to the receiving UE 100R in a period from the time of reception of the previous quality measurement signal to the time of reception of the current quality measurement signal.

Figure 11:
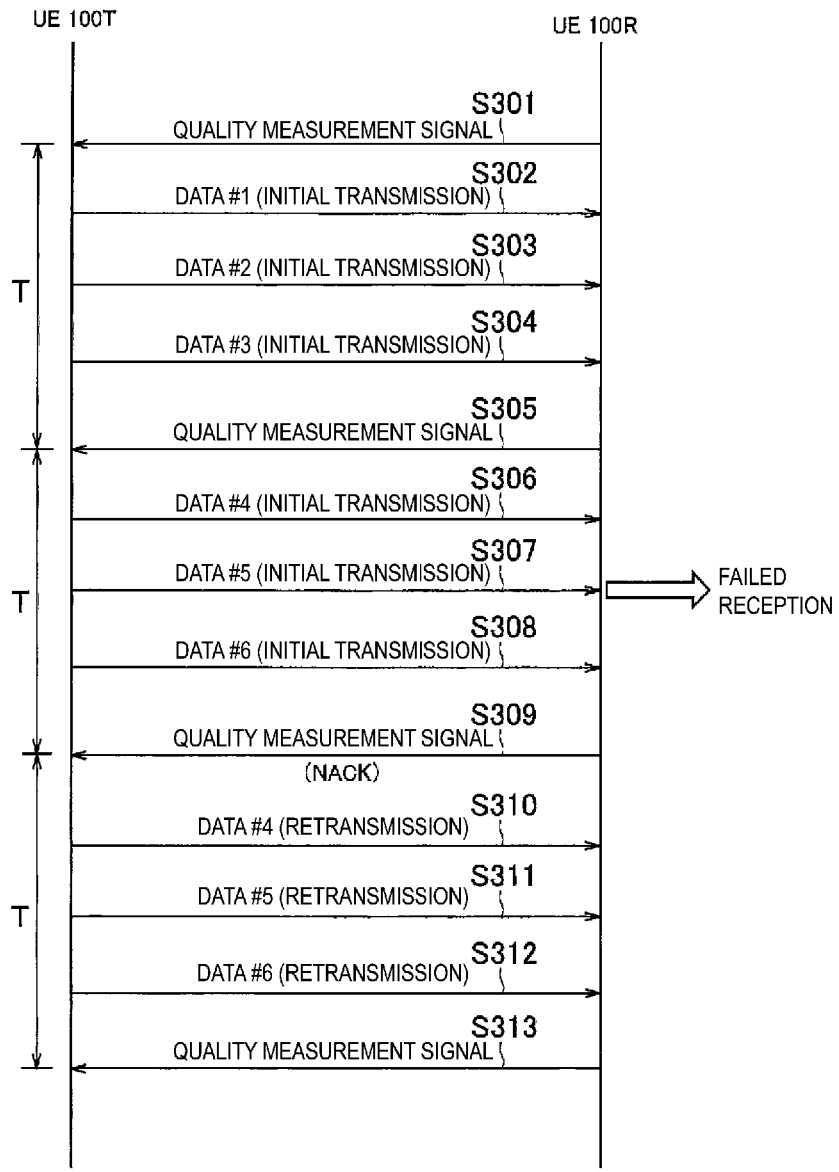
FIG. 11 is a diagram illustrating a specific example of an operation according to a third embodiment.

FIG. 11 is a diagram illustrating a specific example of an operation according to the third embodiment. In the present operation example, the receiving UE 100R transmits a quality measurement signal at a periodicity T. In addition, it is assumed that the transmitting UE 100T performs data transmission three times in the periodicity T.

As illustrated in FIG. 11, in step S301, the receiving UE 100R transmits a quality measurement signal. The transmitting UE 100T may estimate the CSI between the transmitting UE 100T and the receiving UE 100R on the basis of the quality measurement signal received from the receiving UE 100R, and may adjust the MCS and the like (so-called link adaptation) in accordance with the estimated CSI.

In steps S302 to S304, the transmitting UE 100T transmits data #1 to #3 (initial transmission). Here, #1 to #3 correspond to sequence numbers of the data. The receiving UE 100R correctly receives the data #1 to #3 (i.e., successfully decodes the data #1 to #3). In this case, the receiving UE 100R does not perform ACK/NACK feedback.

In step S305, the receiving UE 100R transmits the quality measurement signal. In steps S306 to S308, the transmitting UE 100T transmits data #4 to #6 (initial transmission). The receiving UE 100R correctly receives the data #4 and #6, but does not correctly receive the data #5 (i.e., fails to decode the data #5). In this case, the receiving UE 100R determines to perform the NACK feedback.

In step S309, the receiving UE 100R transmits the quality measurement signal including the NACK. In steps S310 to S312, the transmitting UE 100T retransmits the data #4 to #6. The receiving UE 100R correctly receives the data #4 to #6. In this case, the receiving UE 100R does not perform the ACK/NACK feedback. In step S313, the receiving UE 100R transmits the quality measurement signal.

Fourth Embodiment

Next, a fourth embodiment will be described while focusing on differences from the above-described embodiments. The fourth embodiment is an embodiment related to ACK/NACK feedback from the receiving UE 100R to the transmitting UE 100T in sidelink communication.

In the fourth embodiment, the gNB 200 allocates an identical radio resource for NACK transmission (hereinafter referred to as a "NACK transmission radio resource") to a group including a plurality of UEs 100 that perform sidelink communication by multicast. Here, the NACK transmission radio resource may include not only a time and frequency resource but also a signal sequence.

One or a plurality of receiving UEs 100R included in the group transmit, when data from the transmitting UE 100T included in this group have not been able to be correctly received, the NACK to the transmitting UE 100T by using the NACK transmission radio resource allocated from the gNB 200.

In this way, by allocating the identical NACK transmission radio resource to the receiving UEs 100R, radio resources can be saved in comparison with a case in which NACK transmission radio resources different from each other are allocated to the respective receiving UEs 100R.

In the fourth embodiment, each receiving UE 100R may perform only NACK transmission without performing ACK transmission. This allows the radio resource for ACK transmission to not be required, thus saving radio resources.

Note that if a plurality of receiving UEs 100R transmit NACKs by using an identical NACK transmission radio resource, the NACKs are combined in the propagation channel, and the transmitting UE 100T is not able to identify a receiving UE 100R from which the NACK has been received. However, when receiving NACK from any of the receiving UEs 100R in the group, the transmitting UE 100T performs data retransmission by multicast, and thus it is not necessary to uniquely identify the receiving UE 100R of the transmission source of the NACK.

Figure 12:
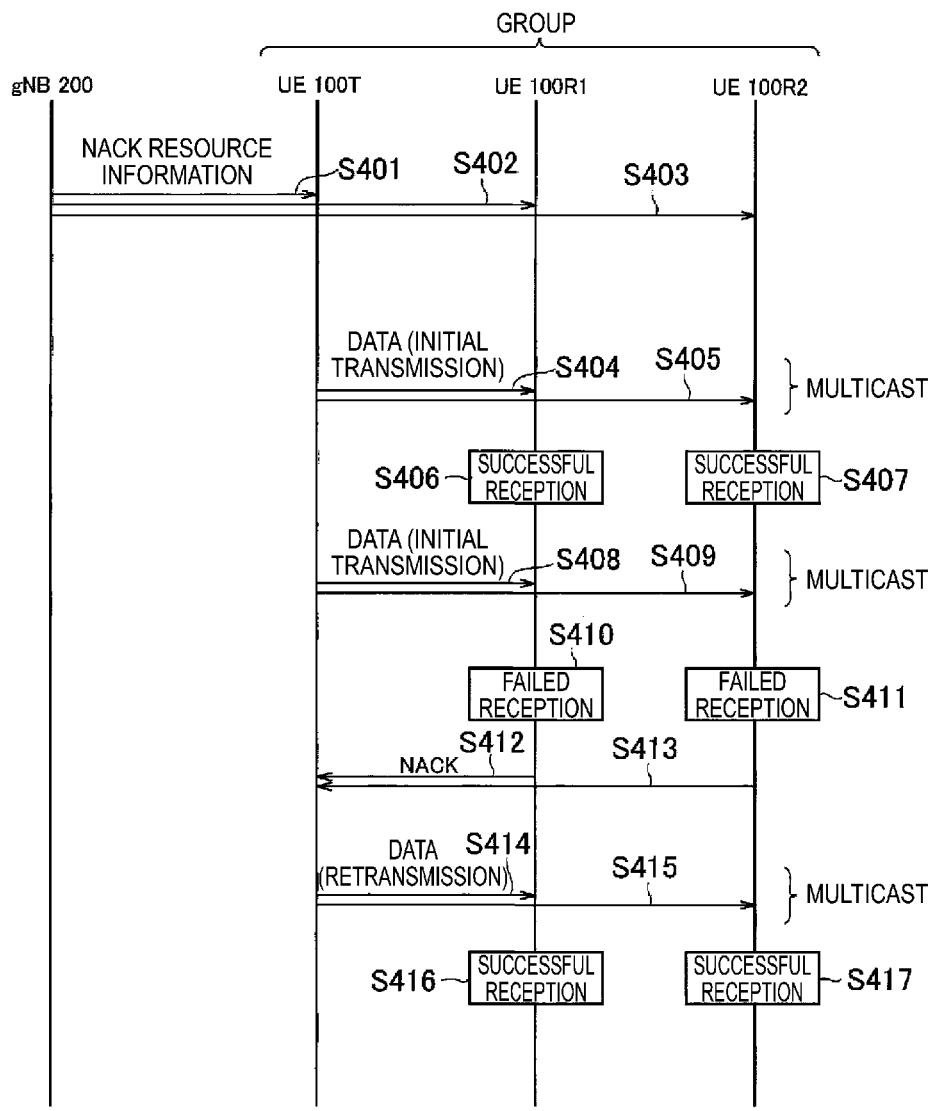
FIG. 12 is a diagram illustrating a specific example of an operation according to a fourth embodiment.

FIG. 12 is a diagram illustrating a specific example of an operation according to the fourth embodiment. In the present operation example, it is assumed that one transmitting UE 100T and two receiving UE 100R1 and UE 100R2 are present in the group.

As illustrated in FIG. 12, in steps S401 to S403, the gNB 200 transmits NACK resource information indicating a NACK transmission radio resource to each of the UEs 100 in the group. The gNB 200 may transmit, by unicast, the NACK resource information individually addressed to each of the UEs 100, or may transmit, by multicast, the NACK resource information addressed to the group. Each of the UEs 100 in the group stores the NACK resource information received from the gNB 200.

In steps S404 and S405, the transmitting UE 100T transmits data to the receiving UE 100R1 and UE 100R2 by multicast (initial transmission). In steps S406 and S407, the receiving UE 100R1 and UE 100R2 correctly receive the data. In this case, the receiving UE 100R1 and UE 100R2 do not perform ACK/NACK feedback.

In steps S408 and S409, the transmitting UE 100T transmits data to the receiving UE 100R1 and UE 100R2 by multicast (initial transmission). In steps S410 and S411, the receiving UE 100R1 and UE 100R2 fail to receive the data.

In this case, in steps S412 and S413, the receiving UE 100R1 and UE 100R2 transmit NACK by using the NACK transmission radio resource allocated from the gNB 200 in steps S402 and S403.

In steps S414 and S415, in response to reception of the NACK, the transmitting UE 100T retransmits the data having been transmitted in steps S408 and S409 by multicast. In steps S416 and S417, the receiving UE 100R1 and UE 100R2 correctly receive the data. In this case, the receiving UE 100R1 and UE 100R2 do not perform the ACK/NACK feedback.

Other Embodiments

Each of the embodiments and modifications described above may not only be separately and independently implemented, but also be implemented in combination of two or more embodiments and/or two or more modifications.

In addition, in each of the embodiments described above, it is assumed that the UE 100 is located within the coverage of the gNB 200, and the case where the UE 100 is located outside the coverage has not been particularly considered. However, in the first embodiment, the first resource information and the first transmission type information (and subcarrier spacing information) may be preconfigured in the UE 100. For example, the first resource information and the first transmission type information (and subcarrier spacing information) may be stored in a Universal Integrated Circuit Card (UICC) of the UE 100 beforehand. Furthermore, in the fourth embodiment, the NACK resource information may be preconfigured in the UE 100. For example, the NACK resource information may be stored in the UICC of the UE 100 beforehand.

In each of the embodiments described above, the 5G system (NR) is primarily described, but operations according to each embodiment may be applied to LTE. In such a case, the above-described RRC inactive mode may be replaced with a suspended state. The suspended state is one of the states of the RRC idle mode.

Note that a program for causing the computer to execute each processing performed by the UE 100 or the gNB 200 may be provided. The program may be recorded on a computer readable medium. By using the computer readable medium, it is possible to install the program in the computer. Here, the computer readable medium on which the program is recorded may be a non-transitory recording medium. The non-transitory recording medium is not particularly limited, but may be a recording medium such as a CD-ROM, a DVD-ROM, or the like, for example.

In addition, circuits for executing the respective processes performed by the UE 100 or the gNB 200 may be integrated, and at least part of the UE 100 or the gNB 200 may be configured as a semiconductor integrated circuit (chipset, SoC).

An embodiment has been described in detail above with reference to the drawings, but the specific configuration is not limited to those described above, and various design modifications and the like can be made without departing from the gist.

The invention claimed is:

1. A communication control method comprising:
receiving at a user equipment, a system information block broadcasted from a base station, the system information block including resource information related to a carrier frequency utilizable in sidelink communication;
receiving at the user equipment from the base station, mapping information indicating mapping of a carrier frequency utilizable in sidelink communication to a transmission type; and
transmitting, by the user equipment to the base station, based on the resource information, a Radio Resource Control (RRC) message for requesting a radio resource for the sidelink communication, the RRC message including information indicating a carrier frequency which the user equipment desires to apply to the sidelink communication, wherein
the RRC message includes transmission type information indicating a transmission type corresponding to the sidelink communication for which to request the radio resource, the transmission type being one of unicast, groupcast, and broadcast.

2. The communication control method according to claim 1, wherein
the resource information includes information indicating BWP (Bandwidth part) utilizable in the sidelink communication.

3. A user equipment comprising:
a receiver configured to
receive, a system information block broadcasted from a base station, the system information block including resource information related to a carrier frequency utilizable in sidelink communication, and
receive from the base station, mapping information indicating mapping of a carrier frequency utilizable in sidelink communication to a transmission type; and
a transmitter configured to transmit, to the base station, based on the resource information, a Radio Resource Control (RRC) message for requesting a radio resource for the sidelink communication, the RRC message including information indicating a carrier frequency which the user equipment desires to apply to the sidelink communication, wherein
the RRC message includes transmission type information indicating a transmission type corresponding to the sidelink communication for which to request the radio resource, the transmission type being one of unicast, groupcast, and broadcast.

4. A chipset for controlling a user equipment, the chipset comprising:
a processor and a memory coupled to the processor, the processor configured to:
receive, a system information block broadcasted from a base station, the system information block including resource information related to a carrier frequency utilizable in sidelink communication;
receive from the base station, mapping information indicating mapping of a carrier frequency utilizable in sidelink communication to a transmission type; and
transmit, to the base station, based on the resource information, a Radio Resource Control (RRC) message for requesting a radio resource for the sidelink communication, the RRC message including information indicating a carrier frequency which the user equipment desires to apply to the sidelink communication, wherein
the RRC message includes transmission type information indicating a transmission type corresponding to the sidelink communication for which to request the radio resource, the transmission type being one of unicast, groupcast, and broadcast.

* * * * *